(12) United States Patent
Novoselov

(10) Patent No.: US 11,186,781 B2
(45) Date of Patent: Nov. 30, 2021

(54) PULSED POWER SUPPLY

(71) Applicant: LTEOIL LLC, Houston, TX (US)

(72) Inventor: Yury Novoselov, Houston, TX (US)

(73) Assignee: LTEOIL LLC, Houston, TX (US)

( * ) Notice: Subject to any disclaimer, the term of this patent is extended or adjusted under 35 U.S.C. 154(b) by 253 days.

(21) Appl. No.: 16/090,111

(22) PCT Filed: Mar. 30, 2017

(86) PCT No.: PCT/US2017/025077
§ 371 (c)(1),
(2) Date: Sep. 28, 2018

(87) PCT Pub. No.: WO2017/173112
PCT Pub. Date: Oct. 5, 2017

(65) Prior Publication Data
US 2019/0112534 A1   Apr. 18, 2019

Related U.S. Application Data

(60) Provisional application No. 62/315,819, filed on Mar. 31, 2016.

(51) Int. Cl.
*C10G 15/08* (2006.01)
*F02C 7/266* (2006.01)
(Continued)

(52) U.S. Cl.
CPC .............. *C10G 15/08* (2013.01); *F02C 7/266* (2013.01); *F02P 23/04* (2013.01); *F23Q 13/00* (2013.01); *C10G 2300/302* (2013.01)

(58) Field of Classification Search
CPC ... C10G 15/08; C10G 2300/302; F02C 7/266; F02P 23/04; F23Q 13/00; H03K 3/537; H03K 3/57; H03K 3/55; H03K 3/53; H03K 3/42; H03K 3/00; H01B 17/28; H01B 17/42; H01B 17/62; H01R 13/53; H02M 7/51; H02M 1/04
See application file for complete search history.

(56) References Cited

U.S. PATENT DOCUMENTS 2,418,842 A * 4/1947 Kinsburg ................ H03B 5/22
                                                    331/137
3,703,661 A * 11/1972 Le Goff ................... H03K 3/53
                                                    315/155
(Continued)

FOREIGN PATENT DOCUMENTS

WO    WO-2014/209803 A1    12/2014

OTHER PUBLICATIONS

Examination Report on GC Application No. 2017-33128 dated Mar. 28, 2019. 5 pages.
(Continued)

*Primary Examiner* — Xiuyu Tai
(74) *Attorney, Agent, or Firm* — Foley & Lardner LLP

(57) ABSTRACT

The electrical circuit of power supply includes a series of discharge gaps, storage capacitors, and charging resistors. The work of multispark reactor based on the parallel breakdown of discharge gaps in the mode of self-breakdown. Simultaneous triggering of all gaps is achieved using self-breakdown on the rising edge of voltage, particularly when using the power frequency AC voltage.

20 Claims, 2 Drawing Sheets

(51) Int. Cl.
*F02P 23/04* (2006.01)
*F23Q 13/00* (2006.01)

(56) References Cited

U.S. PATENT DOCUMENTS 3,863,105 A 1/1975 Ewanizky
2011/0026282 A1 2/2011 Chapman et al.

OTHER PUBLICATIONS

International Search Report and Written Opinion on International Patent Application No. PCT/US2017/025077 dated Aug. 10, 2017. 13 pages.

* cited by examiner

PULSED POWER SUPPLY

CROSS-REFERENCE TO RELATED APPLICATIONS

This application is a U.S. national stage application under 35 U.S.C. § 371 of International Application No. PCT/US2017/025077, filed on Mar. 30, 2017, which claims the benefit of priority to U.S. Provisional Patent Application No. 62/315,819, filed on Mar. 31, 2016, the contents of each of which are incorporated herein by reference in their entirety for any and all purposes.

TECHNICAL FIELD

The present application generally relates to high voltage power circuits of electric devices and, in particular, to a method for organizing of parallel operation a large number of electric discharges in a multispark plasma chemical reactor.

BACKGROUND

The background description is provided only to further the understanding of the reader, and none of the information in this section is admitted to be prior art.

Pulsed power is used in many circumstances. Typically, a switch is used to provide pulsed power. For example, a switch that oscillates from open to closed at a regular interval will provided pulsed power to a first end while power (e.g., direct current power) is applied to the second end. However, in instances in which mechanical or electronic switches are used to generate pulsed power with a high current, such switches typically have high inductance, which may be detrimental to the circuit or inefficient. Further, such switches are often expensive and lead to complicated construction of such circuits.

SUMMARY

One embodiment relates to an electrical circuit for providing a power supply. In some embodiments, the power supply provides power to a multispark reactor for treating a liquid hydrocarbon material. The electrical circuit includes a plurality of discharge gaps, a common high voltage bus, a common grounded bus, a plurality of charging resistors, and a plurality of storage capacitors. Each discharge gap includes a first electrode and a second electrode separated from the first electrode. In some embodiments, the first electrode and the second electrode are separated to form a working channel for treating liquid hydrocarbon material therein. The common high voltage bus is configured to be electrically connected to a high-voltage output of a power source. Each resistor has a first end electrically connected to the high voltage bus and a second end electrically connected to the first electrode of the associated discharge gap. Each capacitor is electrically connected in parallel to one associated discharge gap. Each capacitor includes a first end electrically connected to the grounded bus and the second electrode of the associated discharge gap, and a second end electrically connected to the second end of the associated resistor and the first electrode of the associated discharge gap.

Another embodiment relates to a method of treating a liquid hydrocarbon material, such as, for example, crude oil. The method includes (e.g., the steps of) passing the liquid hydrocarbon material through a plurality of discharge gaps in a multispark reactor, where each discharge gap is defined by a first electrode and a second electrode separated from the first electrode by a spacing; and passing a current through each discharge gap of the multispark reactor to heat the liquid hydrocarbon material to a breakdown temperature Yet another embodiment relates to a multispark reactor for treating a liquid hydrocarbon material, such as, for example, crude oil. The reactor includes a power supply configured to provide a high-voltage output and an electrical circuit. The electrical circuit includes a plurality of electrode pairs, a common high voltage bus, a common grounded bus, a plurality of charging resistors, and a plurality of storage capacitors. Each electrode pair includes a first electrode and a second electrode separated from the first electrode to form a discharge gap between the electrodes for treating the liquid hydrocarbon material therein. The common high voltage bus is configured to be electrically connected to the high-voltage output. Each resistor has a first end electrically connected to the high voltage bus and a second end electrically connected to the first electrode of the associated electrode pair. Each capacitor is electrically connected in parallel to one associated electrode pair. Each capacitor includes a first end electrically connected to the second electrode of the associated electrode pair through the grounded bus, and also includes a second end electrically connected to the second end of the associated resistor and the first electrode of the associated electrode pair.

DETAILED DESCRIPTION

Figure 1:
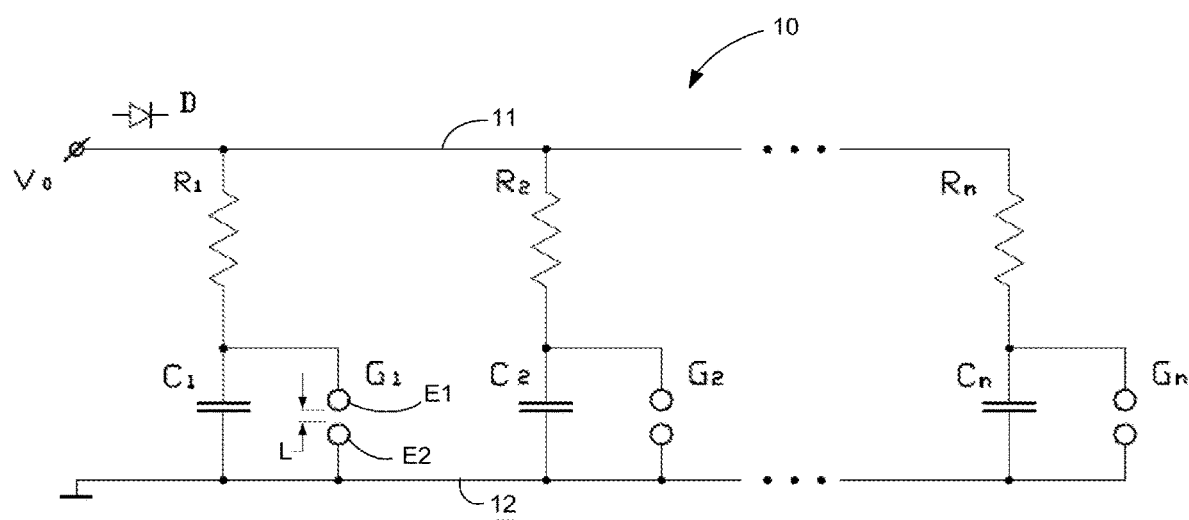
FIG. 1 is a diagram of an electrical circuit, according to an exemplary embodiment.

With general reference to the figures, disclosed in this application are devices and processes for generating parallel pulsed electrical energy. In an example use, the parallel pulsed electrical energy can be used to generate sparks across multiple electrode gaps while passing liquid hydrocarbon materials through the gaps. The sparks create plasma between the gaps, thereby converting heavier liquid hydrocarbon materials (e.g., crude oil) into lighter hydrocarbon fractions using a spark discharge reactor. In some embodiments, the devices and processes relate to processing crude oil containing heavy hydrocarbon molecules into the lighter liquid and/or gaseous fractions. The devices and processes, as disclosed herein, can be utilized for the cracking of liquid heavy oils to lighter hydrocarbon fractions by using a stream of carrier gas injected into the liquid heavy oil to form a mixture, followed by ionization of the mixture by spark discharge. These devices and processes may be applied to achieve efficient crude heavy oil conversion due to the use of a multispark reactor having one or more channels, with each channel including a row of spark discharge gaps. The devices and processes may employ an electrical circuit electrically coupled to a power supply of the multispark reactor to heat the heavier liquid hydrocarbon materials to decrease the viscosity of the materials. In alternative embodiments, the devices and processes can be used for generating a pulsed power supply (e.g., as a pulsed voltage generator).

Oil and oil products are used globally in many different forms, such as fuel, lubricants, building materials, etc. Crude oil (e.g., raw oil) is typically pumped from the ground, such as at an oil well site on land, or using platforms on the water. The crude oil is typically transported to a production facility before being processed. However, the crude oil is often more viscous than desired for transport. The crude oil can be transported via pipes, valves, ports, hoses, tankers, and the like. In many instances, the viscosity of the crude oil must be reduced prior to transport, to facilitate better flow and movement of the crude oil.

Various methods can be used to decrease the viscosity of crude oil. For example, oil diluents can be used to facilitate flow (e.g., by decrease the viscosity) of the crude oil. One example of an oil diluent is water (e.g., fresh water). In such an example, after the crude oil arrives at its destination (e.g., a processing plant, production plant, refinery, etc.), the crude oil is separated from the oil diluents. The initial separation of the oil diluents from the crude oil can result in contaminated oil diluents. However, separation of the water from the oil post-transport typically results in contaminated water that can be difficult to dispose of environmentally. Demulsifiers (e.g., emulsion breakers) may be used to aid in the separation of the oil from the water. However, once separated from the oil, the water generally contains the demulsifiers, residual crude oil, and other impurities from the crude oil.

Non-water diluents can also be used to decrease the viscosity of crude oil. For example, mixtures of light fractions of oil (which may be obtained via thermal cracking, catalytic cracking, catalytic reforming, or via other methods known in the art) may be used as non-water diluents. Such light fractions of oil can be mixed with the heavy oil and/or bitumen, in order to decrease the viscosity thereof. However, using the light oil fractions usually necessitates the addition of special mixing stations before the crude oil is transported, as well as additional separation stations at the destination. Oftentimes, material is transported in both directions. For example, one pipeline is used to transport the diluted crude oil to a production facility from a well site, and another pipeline is used to transport the diluents from the production facility to the well site for reuse. In such examples, significant cost is incurred for the additional transportation, such as by truck or additional pipelining; processing equipment, such as mixing stations, separation stations; energy; and the like. These additional processing steps can greatly increase the cost associated with the production and processing of crude oil.

It would be advantageous to reduce the viscosity of liquid hydrocarbon materials without the use of water or diluents in the form of light hydrocarbon fractions, such as light oil, gasoline, kerosene, and diesel. The present application is directed to devices and methods that are configured to reduce the costs associated with viscosity reduction in liquid hydrocarbon materials, such as crude oil and bitumen.

For example, the devices and processes may be configured to decrease the viscosity of heavy oils to facilitate transportation of the oils, such as at the starting point of a pipeline. A method of pulse cracking, which is carried out using pulsed electric discharges in the gas stream traveling through the flow of oil, may be employed. A pulsed electric discharge method may advantageously allow the transported oils to be pulse heated to a controlled temperature range in small volumes surrounding a plasma channel of the spark discharge. The carbon to carbon (C—C) bonds in alkane, alkene, and other suitable types of hydrocarbon molecules are fractured mainly upon reaching a temperature sufficient to break down heavy hydrocarbon molecules (e.g., a breakdown temperature), while the synthesis of lighter molecules occurs. Treatment of the hydrocarbon mixture may take place in a small volume of fluid surrounding the plasma channel. The reactor may include a plurality of discharge gaps, which may be arranged sequentially (e.g., in line), along the transfer piping configured to transport the oils.

The heavier liquid hydrocarbon materials (e.g., crude oil, oil, etc.) may be treated according to a method of electrophysical processing involving the use of a large number of sparks. Multispark reactors may be employed to treat, for example, large oil flows, and multispark reactors can be scaled to increase/decrease the amount of material treated.

An electrical circuit of a multispark reactor power supply may be configured to provide simultaneous ignition of a plurality of spark discharges in the reactor. The ignition of spark discharges may advantageously be carried out in a self-breakdown mode of discharge gaps, since this mode provides high efficiency of energy transfer from the storage capacitors to the plasma discharge. This high efficiency is achieved, at least in part, by the circuit not having any switches, which generally consume a portion of the stored energy, such as the energy discharged by the capacitors.

Although described herein are various embodiments for use in a multispark reactor, other embodiments can be used for any other suitable purpose. For example, parallel high-current switches can be used as pulsed power sources, such as a pulsed voltage generator. Some embodiments can be used as a pulsed power source that has short rise and fall times. Some embodiments provide a pulsed power source without the use of mechanical or electronic switches and their associated properties such as relatively long rise and fall times, voltage and/or current drainage, electrical inductance, etc.

FIG. 1 illustrates a diagram of an exemplary embodiment of an electrical circuit. In an illustrative embodiment, the electrical circuit is used with a multispark reactor (e.g., a multispark plasma chemical reactor). In some embodiments, the circuit can be used as a pulsed voltage and/or current source. As shown, the electrical circuit includes a plurality of sparks arranged in parallel. Notably missing from the electrical circuit are any commutators and switches, which typically absorb a significant portion of the transmitted spark plasma energy because formation of the spark discharge takes place in self-breakdown mode.

As shown in FIG. 1, the electrical circuit 10 includes a common high-voltage bus 11 and a common grounded bus 12. In an illustrative embodiment, the high-voltage bus 11 provides an alternating-current (AC) power supply. The high voltage bus 11 is electrically connected to a voltage source $V_0$, and the grounded common bus 2 can be a grounded element of the reactor design (e.g., the common bus 2 can be grounded to another element of the reactor that is grounded). Also shown, the electrical circuit includes a plurality of charging resistors $R_1, R_2 \ldots R_n$; a plurality of storage capacitors $C_1, C_2 \ldots C_n$; and a plurality of discharge gaps $G_1, G_2 \ldots G_n$; where n is the number of discharge gaps, capacitors, and resistors, respectively. It is noted that the use of "n" denotes that any number of resistors, capacitors, and discharge gaps may be used.

Each discharge gap (e.g., $G_1, G_2 \ldots G_n$) includes (e.g., is defined by) a first (e.g., upper) electrode E1 and a second (e.g., lower) electrode E2 that is separated from the first electrode E1 by a spacing distance (e.g., offset, gap, etc.) to form a working channel for treating a liquid hydrocarbon material, such as crude oil, therein. Thus, the electrodes of each discharge gap may be configured to provide a charge (e.g., spark) therebetween while immersed in a liquid hydrocarbon material, such as crude oil.

In alternative embodiments, the gap between the first electrode E1 and the second electrode E2 is filled with a material with a consistent breakdown voltage. For example, the gap can be filled with water, steam, hydrogen, nitrogen, argon, methane, natural gas, and/or one or more other gasses. In such an embodiment, the second electrode E2 can be connected to a load, and the circuit of FIG. 1 can be used as a pulsed voltage source. In some embodiments, the material between the first electrode E1 and the second electrode E2 can be modified to control the voltage provided to the load, the duty cycle of the supplied voltage, etc.

Each resistor (e.g., $R_1, R_2 \ldots R_n$) includes a first end and a second end. The first end of each resistor is electrically connected to the high voltage bus 11. The second end of each resistor is electrically connected to one associated capacitor and/or one associated discharge gap (e.g., electrode pair), such as the first electrode thereof. Each resistor is configured to provide a level of electrical resistance, which may be tailored to the specific design application.

Each capacitor (e.g., $C_1, C_2 \ldots C_n$) is electrically connected in parallel to one associated discharge gap (e.g., electrode pair). Each capacitor includes a first end and a second end. The first end of each capacitor is electrically connected to the grounded bus and the second electrode of one associated discharge gap. For example, the first end of each capacitor may be electrically connected to the associated electrode gap through the grounded bus. The second end of each capacitor is electrically connected to the second end of the associated resistor and the first electrode of the associated discharge gap. Each capacitor is configured to provide a level of energy storage, which may be tailored to the specific design application.

The operation of the electrical circuit 10 will now be described.

Each capacitor is charged through the associated resistor when an electrical current is supplied to the high voltage bus 11 via the voltage source $V_0$. For example, the capacitor $C_n$ is charged through the resistor $R_n$ by the path: high voltage bus 11—resistor $R_n$—capacitor $C_n$—ground bus 12, when a maximum voltage (e.g., maximum amplitude voltage $V_{max}$) is passed through the high voltage bus 11. Once the energy stored in the associated capacitor reaches a threshold voltage (e.g., a breakdown voltage $V_b$), an electrical discharge (e.g., a spark) is passed between the two electrodes of the discharge gap. The electrical discharge can be used to heat a material located between the two electrodes. For example, each spark may be configured to discharge when the voltage on the associated charging capacitor reaches the breakdown voltage $V_b$, such that the breakdown occurs in an unmanaged mode and the channel spark formation takes place between the two electrodes of the associated discharge gap. The stored energy from the capacitor is discharged directly onto the spark channel to transmit the stored energy into the plasma spark channel and to a material therein. In an illustrative embodiment, this energy is used in the process of converting crude oil. For example, the viscosity of the material may be influenced (e.g., decreased) by the discharged spark, such as from heat induced by the spark. In alternative embodiments, this energy is used to supply pulsed power to a load.

Following the electrical discharge (e.g., after breakdown of the discharge gap $G_n$), the side of capacitor opposite the grounded bus (e.g., the second end of each capacitor in the electric circuit 10 shown in FIG. 1) will have a potential that is different from the potential of the grounded bus (e.g., the ground bus 12), such as by a value substantially equal to a voltage drop across the spark channel. The almost complete charging voltage may be applied to each resistor (e.g., the resistor $R_n$). Accordingly, the reduction of the potential of the high voltage bus 11 may occur slightly. This fact makes possible the breakdown of other discharge gaps without a dependence on adjacent gaps.

Using resistors in the charging circuit allows the electrical disconnection of individual capacitors, which may advantageously allow charging each capacitor to the breakdown voltage with a time constant T that is equal to three times the resistance (R) times the capacitance (C) (i.e., T=3·R·C), regardless of whether or not breakdown of adjacent gaps. That is, the use of resistors makes independent processes of charging and breakdown of gaps. Stated differently, inclusion of the resistors in the electrical circuit allows for the process of charging and the process of discharging to be independent processes.

A system utilizing a direct (e.g., constant) voltage may have significant drawbacks. The breakdown of a large number of simultaneous discharge gaps would be very difficult to carry out practically. One reason for this is that a system having each electrode pair spaced apart by the exact same distance (e.g., a length L) is very difficult to build/assemble, such as due to tolerances. In practice, there is always some variation in the length L between the two electrodes of each electrode pair. The variation in the length L may lead to the breakdown voltage $V_b$ of the various discharge gaps/electrode pairs being a different voltage. This means that the breakdown voltage of an electrode pair having a shorter gap/length L will be different than the breakdown voltage of an electrode pair having a longer gap/length L. For example, the breakdown voltage of a shorter gap/length L cannot reach the breakdown value for a longer gap and/or the breakdown voltage of a longer gap/length L cannot reach the breakdown value for a shorter gap. Thus, one of the shorter or longer lengths may not break. According to one non-limiting example, for a reactor containing 12 discharge gaps/electrode pairs, maybe only 2-3 discharge gaps/electrode pairs might work simultaneously.

The devices and processes of this application may be configured to supply the multispark plasma chemical reactor or any suitable electrical load, as shown in FIG. 1, with a voltage having a rising edge. For example, an alternating current (AC) voltage power may be used, such as AC power at an industry frequency (e.g., 50 Hz, 60 Hz, etc.). Some multispark reactor designs or pulsed power generators do not allow the simultaneous use of positive and negative half-wave industry voltage, because one of the electrodes must be grounded or connected to a load as a part of installation design. For example, only the positive half-wave voltage may be used. The electrical circuit 10 may include (e.g., be complemented by) a rectifier diode D, such as at the location shown in FIG. 1, to block either the positive or the negative half of the wave. For example, the rectifier diode D may be configured to produce a unidirectional, pulsating direct current that is supplied to the high voltage bus 11.

Figure 2:
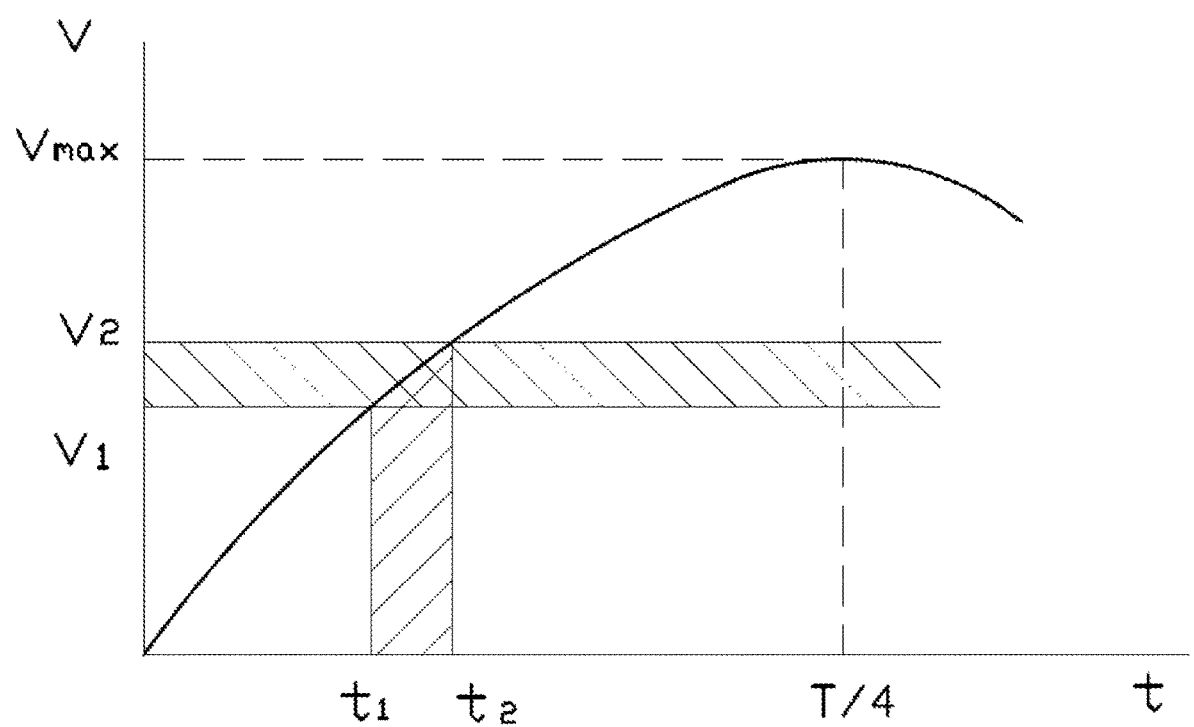
FIG. 2 is a graph showing voltage over time for an electrical circuit, such as the electrical circuit shown in FIG. 1.

FIG. 2 is a graph showing voltage over time for an exemplary embodiment of an electrical circuit. The graph may correspond, for example, to the performance of the electrical circuit 10. The graph shown in FIG. 2 can describe the process of the reactor operating with the rising edge of the voltage. Here, the vertical axis represents the charging voltage V supplied to a capacitor C (e.g., the capacitor $C_1$, the capacitor $C_2$, ... the capacitor $C_n$) and the horizontal axis represents the voltage rise time t. Thus, if an AC voltage is applied, the maximum value (e.g., maximum voltage $V_{max}$)

may be achieved in time T/4, which is equal to a quarter of one period T of the alternating voltage.

Assuming that the scatter of the discharge gap length provides a variation of breakdown voltage between $V_1$-$V_2$ (see FIG. 2), then the breakdown of the shortest gap happens in time moment $t_1$, and the longest gap at time moment $t_2$. With the electrical circuit 10, breakdown in $t_1$ will not prevent the breakdown in $t_2$, since the voltage on the high voltage bus 11 (see FIG. 1) will increase until the breakdown of all discharge gaps/electrode pairs.

The resistance value of each resistor (e.g., resistor $R_n$) may be determined by the charging time of the charging of the associated capacitor (e.g., capacitor $C_n$) and the maximum allowable current of the high voltage power supply 11. The time to reach the breakdown voltage on the electrodes of the associated discharge gap (or on the capacitor $C_n$) shall not exceed the rise time of the charging voltage to a maximum value. In this case, all discharges of the discharge gaps (e.g., sparks, breakdowns, etc.) will occur at (e.g., along) the rising edge of the voltage in the narrow range of time $t_1$-$t_2$.

In embodiments in which the circuit 10 is used in a multispark reactor, the use of voltage with the rising edge (see FIG. 2), in particular, the use of power frequency voltage, as compared with the use of direct voltage may advantageously significantly increase the productivity of each channel multispark reactor. This may be due for a couple of reasons. First, in a system with AC voltage, the breakdowns of all discharge gaps/electrode pairs of the reactor are carried out, for example, simultaneously. Second, all breakdowns occur forcibly with a frequency determined by the frequency of the AC charging voltage.

A couple of examples of multispark reactors will now be discussed.

Example 1

A multispark reactor having one reactor channel was configured to operate with a DC voltage. The construction of the device was implemented in a demonstration plant with the value of discharge gap set to 12. In this example, each capacitor had a capacitance of C=100 pF, and the charged voltage was 15 kV. The distance between the electrodes of each discharge gap average was 3 mm, and the scatter of the gap length was ±0.15 mm. Under these conditions, the frequency of spontaneous breakdowns did not exceed 3-5 Hz, while only 2-3 gaps worked simultaneously. This means there was inefficient use of other gaps of the multispark reactor of example 1.

Example 2

A multispark reactor having nine reactor channels was configured, according to the reactors disclosed in this application. Power supply of these channels was distributed between the phases of the three-phase high voltage transformer, i.e., in three channels for each phase. The electrical circuit of each channel was substantially similar to the electrical circuit 10 shown in FIG. 1. The number of discharge gaps in each reactor channel was set to 25. Thus, each phase of the power supply consisted of 75 spark gaps, and the total number of spark gaps was equal to 225. In the experiments, an industrial three-phase network with the oscillation frequency of 60 Hz was used with the multispark reactor. In these circumstances, all of the discharge gaps were breaking down, while the frequency of breakdowns was equal to the network frequency.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The subject matter described herein sometimes illustrates different components contained within, or connected with, different other components. It is to be understood that such depicted architectures are merely exemplary, and that in fact many other architectures can be implemented to achieve the same functionality. In a conceptual sense, any arrangement of components to achieve the same functionality is effectively "associated" such that the desired functionality is achieved. Hence, any two components disclosed herein that can be combined to achieve a particular functionality can be seen as "associated with" each other, such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An electrical circuit for providing a pulsed power supply comprising:
    a plurality of discharge gaps, each discharge gap including a first electrode and a second electrode separated from the first electrode;
    a common high voltage bus configured to be electrically connected to a high-voltage output of a power source;
    a common grounded bus;
    a plurality of charging resistors, each resistor having a first end electrically connected to the common high voltage bus and a second end electrically connected to the first electrode of the associated discharge gap; and
    a plurality of storage capacitors, each capacitor electrically connected in parallel to one associated discharge gap, each capacitor comprising:
        a first end electrically connected to the common grounded bus and the second electrode of the associated discharge gap; and
        a second end electrically connected to the second end of the associated resistor and the first electrode of the associated discharge gap;
    wherein a resistance value of each of the plurality of charging resistors is equal to one-third of the value of a time constant of an associated storage capacitor divided by a capacitance value of the associated storage capacitor.

2. The electrical circuit of claim 1, wherein the pulsed power supply provides power to a multispark reactor for treating a liquid hydrocarbon material, and wherein the first electrode and the second electrode are separated to form a working channel for receiving the liquid hydrocarbon material therein for treatment.

3. The electrical circuit of claim 1, wherein the common high-voltage bus is configured to receive a high voltage direct current from the power source.

4. The electrical circuit of claim 1, wherein the common high-voltage bus is configured to receive a high voltage alternating current power frequency through a rectifier diode.

5. The electrical circuit of claim 1, wherein the electrical circuit is configured to be used in a multispark reactor to treat crude oil.

6. The electrical circuit of claim 1, wherein the plurality of discharge gaps are arranged in series.

7. The electrical circuit of claim 1, wherein the electrical circuit is configured to pass an electrical discharge between each discharge gap simultaneously.

8. The electrical circuit of claim 1, wherein the plurality of discharge gaps are arranged in parallel.

9. The electrical circuit of claim 1, wherein the electrical circuit does not include any switches.

10. The electrical circuit of claim 1, wherein the electrical circuit does not include any commutators.

11. The electrical circuit of claim 1, wherein the electrical circuit is configured to generate electrical pulses without use of any switches.

12. The electrical circuit of claim 1, wherein the power source is an AC voltage source, and wherein a maximum voltage is achieved in a time that is equal to one quarter of one period of the AC voltage source.

13. The electrical circuit of claim 12, wherein the electrical circuit is configured to generate electrical pulses causing sparks across the discharge gaps at a frequency determined by the AC voltage source.

14. The electrical circuit of claim 13, wherein the electrical pulses are generated on a rising edge of a voltage provided by the AC voltage source between a first time period and a second time period, the second time period not exceeding a rise time associated with the plurality of storage capacitors.

15. The electrical circuit of claim 1, wherein the power source is a three-phase, high voltage transformer.

16. A method of treating a liquid hydrocarbon material using a multispark reactor comprising an electrical circuit, wherein the electrical circuit comprises:
    a plurality of discharge gaps, each discharge gap being defined by a first electrode and a second electrode separated from the first electrode by a spacing;
    a common high voltage bus configured to be electrically connected to a high-voltage output of a power source;
    a common grounded bus;
    a plurality of charging resistors, each resistor having a first end electrically connected to the high voltage bus and a second end electrically connected to the first electrode of the associated discharge gap; and
    a plurality of storage capacitors, each capacitor electrically connected in parallel to one associated discharge gap, each capacitor comprising:
        a first end electrically connected to the grounded bus and the second electrode of the associated discharge gap; and
        a second end electrically connected to the second end of the associated resistor and the first electrode of the associated discharge gap, wherein a resistance value of each of the plurality of charging resistors is equal to one-third of the value of a time constant of an associated storage capacitor divided by a capacitance value of the associated storage capacitor; and
    wherein the method comprises:

passing the liquid hydrocarbon material through the plurality of discharge gaps of the multispark reactor; and passing, via the electrical circuit, a current through each discharge gap of the multispark reactor to heat the liquid hydrocarbon material to a breakdown temperature of the liquid hydrocarbon passing through the plurality of discharge gaps.

17. The method of claim 16, wherein the power source is an AC source, and the electric circuit further includes a diode rectifier that is configured to transform alternative current (AC) to direct current (DC).

18. The method of claim 17, wherein the AC is transformed into a unidirectional, pulsating DC.

19. The method of claim 16, wherein the power source is an AC voltage source, and wherein a maximum voltage is achieved in a time that is equal to one quarter of one period of the AC voltage source.

20. A multispark reactor for treating a liquid hydrocarbon material, the multispark reactor comprising:
 a power supply configured to provide a high-voltage output; and
 an electrical circuit comprising:
  a plurality of electrode pairs, each electrode pair including a first electrode and a second electrode separated from the first electrode to form a discharge gap between the electrodes for treating the liquid hydrocarbon material therein;
  a common high voltage bus configured to be electrically connected to the high-voltage output;
  a common grounded bus;
  a plurality of charging resistors, each resistor having a first end electrically connected to the high voltage bus and a second end electrically connected to the first electrode of the associated electrode pair; and
  a plurality of storage capacitors, each capacitor electrically connected in parallel to one associated electrode pair, each capacitor comprising:
   a first end electrically connected to the second electrode of the associated electrode pair through the grounded bus; and
   a second end electrically connected to the second end of the associated resistor and the first electrode of the associated electrode pair,
  wherein a resistance value of each of the plurality of charging resistors is equal to one-third of the value of a time constant of an associated storage capacitor divided by a capacitance value of the associated storage capacitor.

* * * * *